United States Patent
Zaidi et al.

(10) Patent No.: US 10,049,403 B2
(45) Date of Patent: Aug. 14, 2018

(54) TRANSACTION IDENTIFICATION IN A NETWORK ENVIRONMENT

(71) Applicant: Bank of America Corporation, Charlotte, NC (US)

(72) Inventors: Farrukh Zaidi, Port Washington, NY (US); Husam Abu-Zaydeh, East Brunswick, NJ (US); Brian E. Doyle, Scotch Plains, NJ (US); Jason A. Alizzi, York, SC (US); Sunil R. Bangad, Kendall Park, NJ (US); Sridhar M. Seetharaman, Princeton, NJ (US); Benjamin N. Wu, San Francisco, CA (US); Robert Bosi, East Windsor, NJ (US); Morgan S. Allen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 150 days.

(21) Appl. No.: 14/792,101

(22) Filed: Jul. 6, 2015

(65) Prior Publication Data
US 2017/0012837 A1    Jan. 12, 2017

(51) Int. Cl.
*H04L 12/26* (2006.01)
*G06Q 40/02* (2012.01)
*H04L 29/08* (2006.01)

(52) U.S. Cl.
CPC .............. *G06Q 40/02* (2013.01); *H04L 67/02* (2013.01); *H04L 67/2833* (2013.01)

(58) Field of Classification Search
CPC . G06F 9/5016; G06F 9/45545; G06F 11/3442
(Continued)

(56) References Cited

U.S. PATENT DOCUMENTS 6,108,700 A * 8/2000 Maccabee ........... H04L 41/0631
709/224
2004/0103192 A1* 5/2004 Yli-Korhonen ....... H04M 15/00
709/224

(Continued)

OTHER PUBLICATIONS

"Network Mapping by Replaying Hyperbolic Growth"—Papadopoulos et al, IEEE/ACM Transactions on Networking, vol. 23, No. 1, Feb. 2015 https://www.caida.org/publications/papers/2015/network_mapping_replaying_hyperbolic/network_mapping_replaying_hyperbolic.pdf.*

*Primary Examiner* — Randy Scott
(74) *Attorney, Agent, or Firm* — Michael A. Springs

(57) ABSTRACT

In one embodiment, a system for analyzing and reporting electronic transactions in a network environment includes an interface that may receive a transaction request at a first network device. A processor communicatively coupled to the interface may execute a task associated with the transaction request generate a transaction report associated with the transaction request and the task. The transaction report may include a request identifier, a request field comprising a task identifier and a uniform resource locator (URL) resource name, a time stamp field, a status code field, and a duration field. The interface may communicate the transaction report to a transaction module operable to aggregate the transaction report with one or more additional transaction reports associated with the transaction request using the unique identifier associated with the transaction request.

14 Claims, 9 Drawing Sheets

(58) Field of Classification Search
USPC ..... 709/220, 223, 224, 225, 226; 705/14.36, 705/14.49, 14.53
See application file for complete search history.

(56) References Cited

U.S. PATENT DOCUMENTS

2011/0302569 A1* 12/2011 Kunze ................. G06F 8/62
    717/169
2014/0180809 A1* 6/2014 Boal ................. G06Q 30/0245
    705/14.53

* cited by examiner ations. One or more other
TRANSACTION IDENTIFICATION IN A NETWORK ENVIRONMENT

TECHNICAL FIELD

The present invention relates generally to the field of computer networking and, more specifically, to transaction identification in a network environment.

BACKGROUND

An enterprise may utilize a number of network devices to process electronic transactions and customer requests. The interoperability of these network devices may grow in complexity as the enterprise updates and expands its network. Furthermore, the network devices may be geographically dispersed, creating network latencies. When a transaction or customer request fails, it may be difficult to identify which application or network device caused the failure. Enterprises spend significant resources diagnosing and troubleshooting network failures.

SUMMARY

In accordance with the present disclosure, disadvantages and problems associated with transaction identification in a network environment may be reduced or eliminated.

In one embodiment, a system for analyzing and reporting electronic transactions in a network environment includes an interface that may receive a transaction request at a first network device. A processor communicatively coupled to the interface may execute a task associated with the transaction request generate a transaction report associated with the transaction request and the task. The transaction report may include a request identifier, a request field comprising a task identifier and a uniform resource locator (URL) resource name, a time stamp field, a status code field, and a duration field. The interface may communicate the transaction report to a transaction module operable to aggregate the transaction report with one or more additional transaction reports associated with the transaction request using the unique identifier associated with the transaction request.

In some embodiments, a method for analyzing and reporting electronic transactions in a network environment includes receiving a transaction request at a first network device. Executing a task associated with the transaction request. Generating a transaction report associated with the transaction request and the executed task. The transaction report may include a request identifier comprising a unique identifier associated with the transaction request, a request field comprising a task identifier and a uniform resource locator (URL) resource name, a time stamp, a status code field, and a duration field. The method may further include communicating the transaction report to a transaction module operable to aggregate the transaction report with one or more additional transaction reports associated with the transaction request.

Certain embodiments of the invention may provide one or more technical advantages. One advantage of the present disclosure allows for the seamless, non-invasive insertion of a unique identifier into network communications that is communicable between disparate network device types and protocols. Another technical advantage, allows for the identification network latencies between network devices without the need to install invasive tracking hardware on routing devices. Yet another advantage of the present disclosure allows for a reduction in the storage capacity needed to store transaction logs of network operations. One or more other technical advantages may be readily apparent to one skilled in the art from the figures, descriptions, and claims, included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
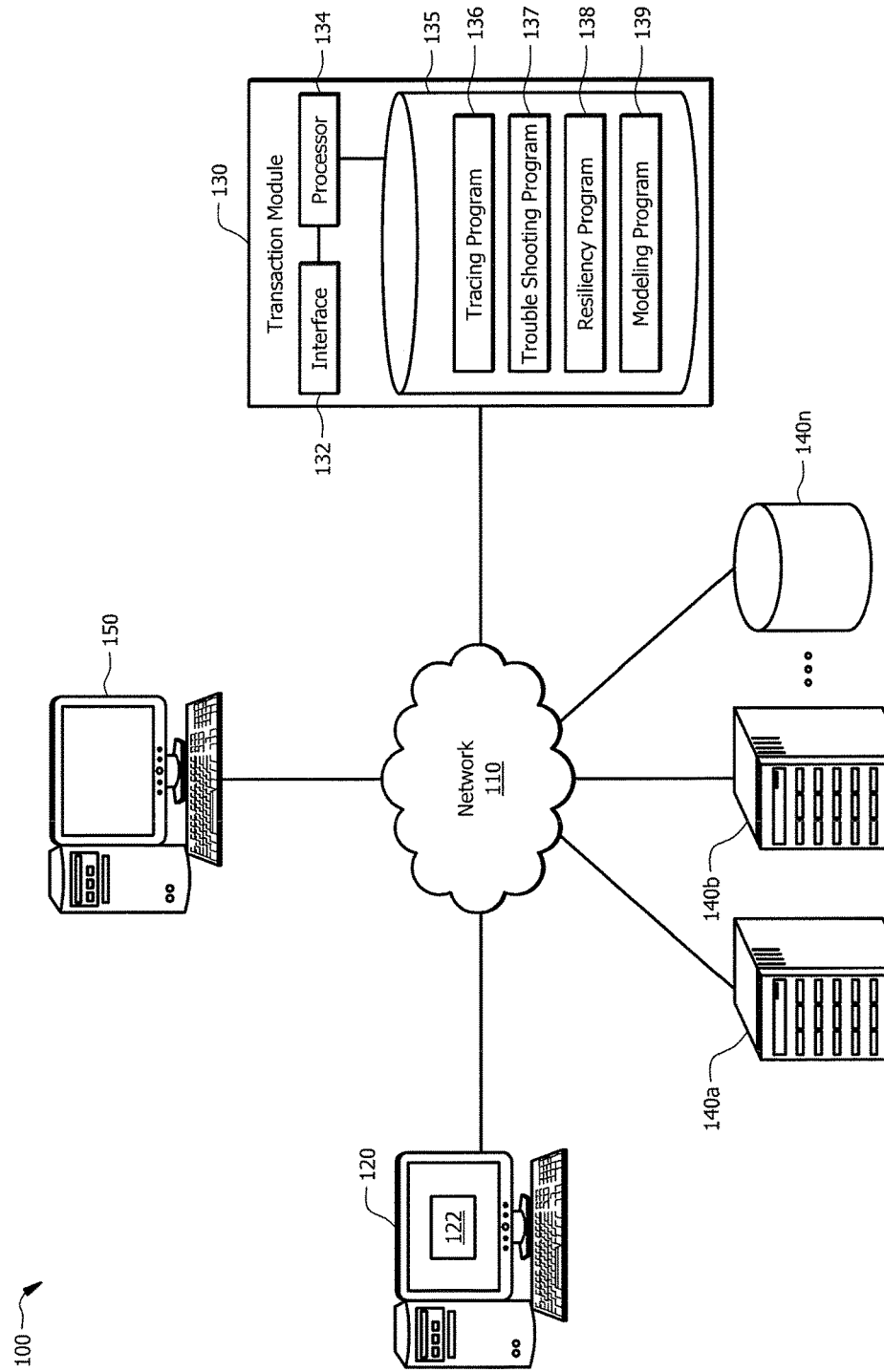
FIG. 1 is an example system for tracking and troubleshooting electronic transactions in a network environment.

Embodiments of the present disclosure and its advantages are best understood by referring to FIGS. 1-9, like numerals being used for like and corresponding parts of the various drawings.

An enterprise may utilize a number of network devices to process electronic transactions and customer requests. The interoperability of these network devices may grow in complexity as the enterprise updates and expands its network. Furthermore, the network devices may be geographically dispersed, creating network latencies. When a transaction or customer request fails, it may be difficult to identify which application or network device caused the failure. Enterprises spend significant resources diagnosing and troubleshooting network failures.

It is therefore advantageous to provide a system and method for identifying, tracking, troubleshooting, and mapping transactions in a network environment. By tracking transactions through a network, an enterprise may quickly identify malfunctioning or inefficient network devices that are causing service interruptions. For example, an enterprise may provide a number of services to its customers through the enterprise's website. These services may depend on the proper operation of one or more network devices such as webservers, application servers, databases, mainframes, routers, network switches, or any other suitable network device. When a service fails or performs inefficiently, it is advantageous for the enterprise to quickly diagnose and remediate the issue. Identifying the source of the operational failure and the reason for the failure may become increasingly difficult as the network grows in complexity and network devices communicate using a number of disparate communication protocols.

If a network device fails during the execution of a transaction, it may be difficult to identify the specific device that failed. The failed device may cause a number of symptoms that negatively affect other network components.

Even if the specific device is identified, a number of applications and programs may utilize the device, making it difficult to identify the specific cause of the failure. Therefore, there is a need for a non-invasive, generic transaction-tracing program that tracks transactions through a number of different network devices.

An enterprise may create a transaction tracing program by having each network device responsible for processing a transaction generate a transaction report. A transaction module may then compile the transaction reports for each of the network devices processing the transaction. To efficiently report the transactions without creating an overabundance of data, each network device may communicate the transaction report in a "one-line" format as a single string. The transaction report text may include one or more fields of data that the enterprise determines are most relevant to troubleshooting and identifying errors in its network.

Once the transaction module receives each of the transaction reports for the transaction, the transaction module may link the reports together to form a transaction flow report. The transaction flow report may then be used to identify if an error occurred while processing the transaction, where and when the error occurred, and the network devices the errors affected.

To triage network errors, the transaction module may identify applications and systems that pose the greatest risk to the network's resiliency. The transaction module may consider a number of factors such as user login information, the transaction type processed, and the downstream network devices affected. An enterprise may use the transaction flow to prioritize the remediation of network errors and efficiently resolve outages.

To understand the interoperability between network devices, the transaction module may also generate a network architecture map to illustrate how one or more network devices handle a transaction request. Using the transaction flow report, the transaction module may display important characteristics of the network such as the backend systems called, the size of data returned by each network device, and the physical location where the network devices are located. For complex networks, this may allow network administrators to identify inefficiencies in the processing of transactions and develop operational plans for the remediation of network errors. FIGS. 1-9 will now describe the foregoing system in greater detail.

FIG. 1 is an example system 100 for tracking and troubleshooting electronic transactions in a network environment. System 100 includes network 110 that facilitates communication between workstation 120, transaction module 130, network devices 140a-n (collectively "network devices 140"), and user device 150. Elements of system 100 may be internal to an enterprise. For example, workstation 120, transaction module 130, and network devices 140 may be associated with an enterprise. An enterprise may be an individual, business, company, or other organization. An example of an enterprise may include a clothing store, an online sales company, or a financial institution. An enterprise may include one or more lines of business, subsidiaries, or parent organizations.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Workstation 120 enables one or more users to monitor, administer, or otherwise interact with transaction module 130 and network devices 140. Workstation 120 may include one or more laptops, personal computers, monitors, display devices, handheld devices, smartphones, servers, user input devices, or other suitable components for enabling user input. Workstation 120 may itself include transaction module 130 and network devices 140. Workstation 120 may be a part of an enterprise or could remotely access an enterprise. In the illustrated embodiment, workstations 120 include a graphical user interface (GUI) 122.

GUI 122 represents any suitable graphical arrangement of information presented to one or more users, network administrators, employees, and/or vendors. For example, GUI 122 may display information received from a website and/or transaction module 130. GUI 122 is generally operable to tailor and filter data entered by and presented to a user. GUI 122 may provide a user with an efficient and user-friendly presentation of information. GUI 122 may comprise a plurality of displays having interactive fields, pull-down lists, and buttons operated by users. GUI 122 may include multiple levels of abstraction including groupings and boundaries. It should be understood that the term GUI 122 may be used in the singular or in the plural to describe one or more GUIs 122 in each of the displays of workstations 120.

Transaction module 130 represents any suitable components that facilitate the tracing, troubleshooting, and modeling of transactions. Transaction module 130 may also facilitate the remediation of identified operational errors by notifying network administrators of network devices 140 causing the operational error. Transaction module 130 may include a network server, remote server, mainframe, host computer, workstation, webserver, personal computer, file server, or any other suitable device operable to communicate with other devices and process data. In some embodiments, transaction module 130 may execute any suitable operating system such as IBM's zSeries/Operating System (z/OS), MS-DOS, PC-DOS, MAC-OS, WINDOWS, UNIX, Open-VMS, Linux, or any other appropriate operating systems, including future operating systems.

The functions of transaction module 130 may be performed by any suitable combination of one or more servers or other components at one or more locations. In the embodiment where the modules are servers, the servers may be public or private servers, and each server may be a virtual or physical server. The server may include one or more servers at the same or at remote locations. Transaction module 130 may also include any suitable component that functions as a server. In some embodiments, workstation 120 and network devices 140 may be integrated with transaction module 130 or they may operate as part of the same device or devices.

In the illustrated embodiment, transaction module 130 includes an interface 132, a processor 134, and a memory 135, which comprises tracing program 136, troubleshooting program 137, resiliency program 138, and modeling program 139.

Interface 132 represents any suitable device operable to receive information from network 110, transmit information through network 110, perform suitable processing of the information, communicate to other devices, or any combination thereof. For example, interface 132 may receive a plurality of transaction reports from network devices 140 processing a transaction. Interface 132 may also communicate alert messages to workstation 120 to notify one or more network administrators of operational errors occurring during the processing of a transaction. In some embodiments, interface 132 may communicate a network architecture map to workstation 120 illustrating network devices 140 utilized by a network to process a transaction. Interface 132 represents any port or connection, real or virtual, including any suitable hardware and/or software, including protocol conversion and data processing capabilities, to communicate through a LAN, WAN, or other communication system that allows transaction module 130 to exchange information with network 110, workstation 120, network devices 140, or any other components of system 100.

Processor 134 communicatively couples interface 132 and memory 135 and controls the operation of transaction module 130. Processor 134 includes any hardware and software that operates to control and process information. Processor 134 may execute computer-executable program instructions stored in memory 135. Processor 134 may include, but is not limited to, a microprocessor, an application specific integrated circuit (ASIC), and or state machines.

Memory 135 stores, either permanently or temporarily, data, operational software, other information for processor 134, other components of transaction module 130, or other components of system 100. Memory 135 includes any one or a combination of volatile or non-volatile local or remote devices suitable for storing information. For example, memory 135 may include RAM, ROM, flash memory, magnetic storage devices, optical storage devices, network storage devices, cloud storage devices, solid state devices, or any other suitable information storage device or a combination of these devices.

Memory 135 may store information in one or more databases, file systems, tree structures, any other suitable storage system, or any combination thereof. Furthermore, different information stored in memory 135 may use any of these storage systems. Moreover, any information stored in memory 135 may be encrypted or unencrypted, compressed or uncompressed, and static or editable. Although illustrated as including particular modules, memory 135 may include any suitable information for use in the operation of transaction module 130.

Network devices 140, represent any suitable number of devices to facilitate the communication of data and provide services for an enterprise. Network devices 140 may include, but are not limited to one or more webservers, application servers, databases, mainframes, routers, network switches, or any other suitable network device. Network devices 140 represents one or more frontend and backend services for an enterprise.

User device 150 enables one or more users to interact with an enterprise through network 110. User device 150 represents one or more laptops, personal computers, monitors, display devices, handheld devices, smartphones, servers, user input devices, or other suitable components for enabling user input. In some embodiments, user device 150 may represent an automated teller machine (ATM) that facilitates financial transactions between the user and a financial institution.

In the illustrated embodiment, memory 135 includes tracing program 136. Processor 134 may implement tracing program 136 to facilitate the tracking of electronic transactions in a network environment. As explained in FIG. 2, tracing program 136 may facilitate the tracking of electronic transactions as they enter an enterprise's network and are processed by network devices 140.

For example, an enterprise may be an online retailer that provides a website for its customers to visit, login, and make purchases. The enterprise may have a number of network devices 140, such as webservers, application servers, databases, load balancers, and network switches, to process the various transactions that the customer may request through the website. While processing these transactions, one or more network devices 140 may encounter an operational failure causing the delay or failure of the customer's transaction.

To identify which network device 140 or application caused the operational failure, tracing program 136 may create a transaction flow report detailing the processing of each transaction handled by the enterprise's network.

As an illustration, a customer may use a web browser to visit the online retailer's website. The retailer's website may provide a "login" icon for the customer to click on and login to their account. A login transaction request may be sent to the retailer's webserver acting as the network entry point for the retailer.

Figure 2:
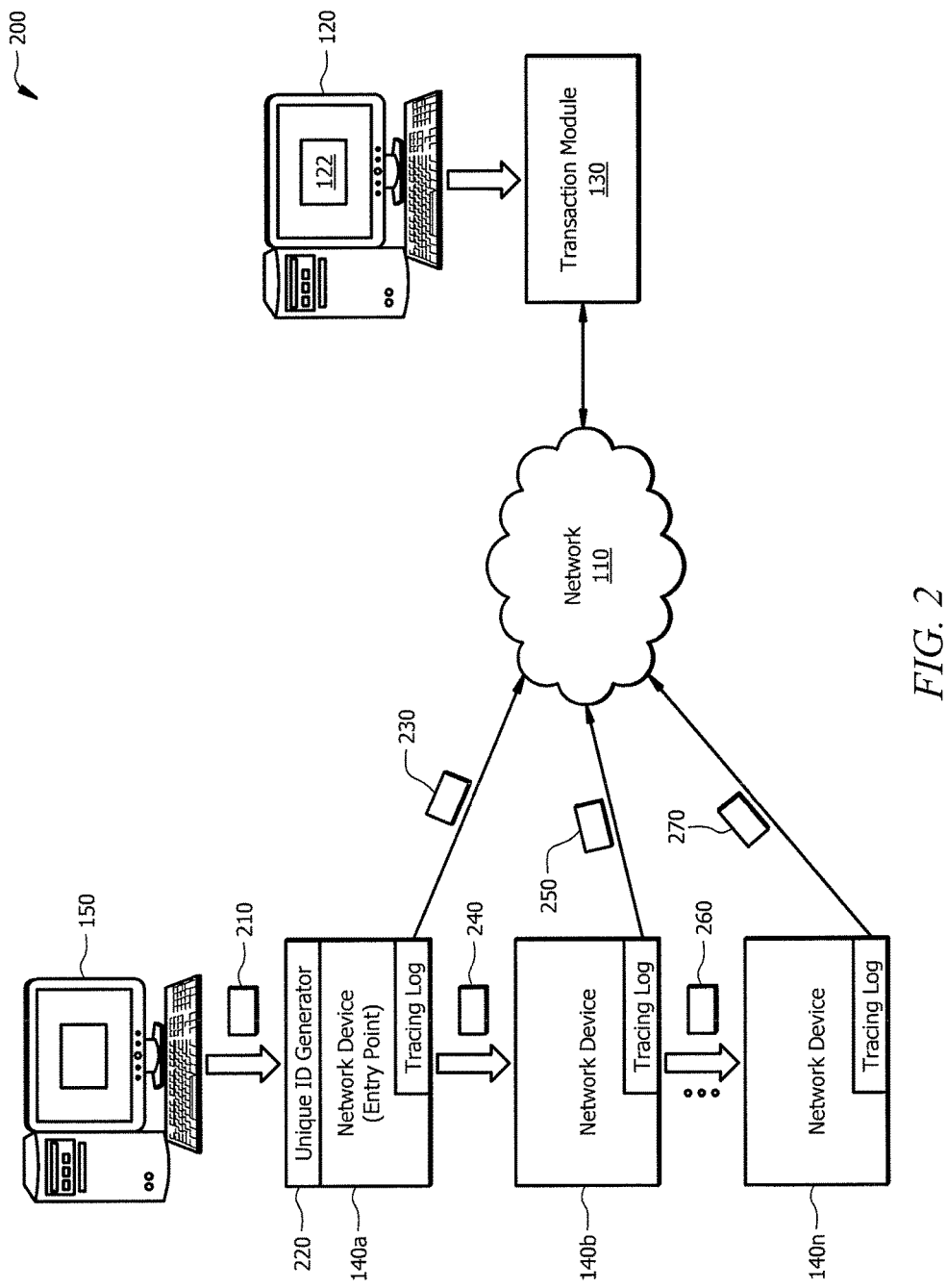
FIG. 2 is an example system for providing asynchronous transaction reports to a transaction module.

As explained in FIG. 2, upon receiving the login transaction request, the webserver may generate a unique identifier and insert the unique identifier into the transaction request. The unique identifier may be any suitable identifier that allows an enterprise to distinguish between the transactions processed by the enterprise's network. In some embodiments, the unique identifier may be a uniform resource locator (URL) safe, alpha-numeric identifier. The webserver may insert the unique identifier into the transaction request based on the communications protocol being utilized. For example, the transaction request may be sent to the webserver using an HTTP protocol. The webserver may then inject the unique identifier as the header in the transaction request.

The webserver may then transmit the transaction request to one or more application servers and databases to complete processing the transaction request. Each network device 140 may have a specified task to carry out based on the transaction request. For example, an application server may be responsible for checking the login credentials (e.g., user name and password) of the customer by accessing a secure database while another application server accesses and returns the customer's information (e.g., credit card number and email address). By incorporating the same unique identifier into each subsequent transaction used to carry out the request, each network device 140 in the processing chain may be identified.

Once each network device 140 processes its portion of the transaction, each network device 140 may generate and communicate a transaction report to transaction module 130. As described in FIG. 3, each transaction report may include a number of data fields describing how each network device 140 processed the transaction request. Relevantly, each transaction report may include the unique identifier and a status field indicating whether the transaction was processed successfully.

Transaction module 130 may receive a transaction report from network devices 140 processing the transaction. Tracing program 136 may then identify and aggregate the transaction reports having the same unique identifier. Tracing program 136 may organize the transaction reports in chronological order (or reverse chronological order) to illustrate how and when each network device 140 received the transaction, processed the transaction, and called other network devices 140 to process the transaction.

In some embodiments, the status field returned by network devices 140 may indicate that the transaction was processed unsuccessfully. Tracing program 136 may identify the failed status, identify which network device 140 returned the failed status, and identify a network administrator responsible for the failing network device. Tracing program 136 may determine an appropriate network administrator in any suitable manner. In some embodiments, the responsible network administrator is returned as a field in each transaction report. In certain embodiments, tracing program 136 accesses a database of network administrators to determine an appropriate administrator. The notification message may be sent using any appropriate communications protocol. For example, notification message may be sent as an email, an SMS message, a pre-recorded voice message, or any other suitable method.

Depending on the type of fields included in each transaction report, processor 134 may implement troubleshooting program 137 to provide a more detailed analysis of the operational errors occurring in an enterprise's network. Troubleshooting program 137 may analyze each transaction report and identify the specifics of an operational failure.

An enterprise may determine an overall expected time to process a specific transaction, as well as an expected time for each network device 140 to process its respective portion of the transaction. For example, an enterprise may determine that processing a transaction request to return a user's account details should take 1200 milliseconds. Furthermore, the enterprise may identify the tasks processed by each webserver, application server, and database used to process the request and assign each transaction an expected processing time. For instance, an application server authenticating a user's credentials before accessing the user's account data may have an expected processing time of 75 milliseconds.

To determine whether transactions are being processed efficiently, each transaction report may include a duration field indicating a time period that each network device 140 took to process a transaction. For example, a status field of a transaction report may indicate that an error or delay occurred when processing a transaction request. Using the duration field, troubleshooting program 137 may identify that the time taken to process the transaction by network device 140a exceeded an expected time to process the transaction. Troubleshooting program 137 may then communicate a duration alert message to the network administrator responsible for network device 140a. This may allow the network administrator to determine whether network device 140a needs to be upgraded or whether there is another issue causing the inefficient processing time, such as a slow backend call.

As another example, troubleshooting program 137 may identify a task that network device 140a was executing when network device 140a experienced the operational error. Each transaction report may include a request field comprising a task identifier. The task identifier may identify a task requested of the network device (e.g., GET, HEAD, POST, PUT, SELECT, INSERT, DELETE), and may depend on the communication protocol used (e.g., HTTP, SQL, JAVA, PHP). Troubleshooting program 137 may then include the method/command being executed when network device 140a experienced the operational failure in the notification to the relevant network administrator.

Including the task information related to an operational error may assist the network administrator in determining the cause of the operational error. For instance, the network administrator may determine that network device 140a operates normally when processing certain transactions but produces an error when processing other transactions. The network administrator may determine that the errors are all related to the same command. This may assist the network administrator in narrowing the cause of the error.

In some embodiments, troubleshooting program 137 may identify a transmission latency between network devices 140 processing a transaction. The transaction reports communicated by each network device may include a timestamp field and a source internet protocol (IP) field. The timestamp field may indicate a date and a time that each network device 140 received the transaction and the source IP field may include the IP address of the upstream network device communicating the transaction.

For example, a webserver may receive a transaction request from a user's browser and, based on the request, communicate the transaction to an application server. The application server's transaction report may include the time and date that it received the transaction request from the webserver as well as the IP address of the webserver. Similarly, the webserver's transaction report may indicate the time and date it received the request from the web browser and indicate the IP address of the web browser. Additionally or alternatively, the webserver, as the network entry device, may indicate that it is the network entry device in the source IP field.

Troubleshooting program 137 may link together the flow of the transaction from the webserver to the application server using the source IP address fields. Troubleshooting program 137 may compare the timestamp indicated by the webserver with the timestamp indicated by the application server. Troubleshooting program 137 may then determine the delay in time between when the webserver received the request and when the webserver communicated the request to the application server.

Troubleshooting program 137 may compare the delay to an expected delay time for the transaction. For example, some transactions may be performed synchronously with several downstream network devices being called at substantially the same time, while some transactions are performed asynchronously and downstream network devices are called at different times.

If the actual delay between network devices 140 exceeds an expected delay, troubleshooting module 137 may communicate a transmission latency alert message to one or more network administrators associated with network devices 140. In some embodiments, troubleshooting module 137 may also indicate whether the communication is a synchronous or asynchronous communication.

Troubleshooting program 137 may identify an operational error occurring in one or more backend systems called by network device 140a. For example, the transaction report communicated to transaction module 130 may include a backend call summary field identifying one or more backend systems called by network device 140a, to process the transaction request. The backend summary call field may include information such as the backend system called, the method used, the time the backend call started, and the duration of the backend call.

For instance, an application server may process a frontend call to store an email address provided by a user. The application server may make a call to one or more backend systems to store the email address in a database. The backend system may encounter an operational error when processing the request resulting in a delay in storing the email. Troubleshooting program 137 may identify that the backend system call made by the application server encountered an error based on the duration field of the backend call summary field. Troubleshooting program 137 may communicate a backend call summary alert message to one or more network administrators associated with the network device and/or backend systems.

In this manner, troubleshooting program 137 may enhance the ability of transaction module 130 to trace transaction requests through a network and identify the operational issues that each transaction request may encounter.

Once an operational error is identified, an enterprise may wish to prioritize the most critical operational errors. This may allow the enterprise to efficiently allocate resources to ensure the proper operation of the enterprise's network. Processor 134 may implement resiliency program 138 to increase network resiliency and prioritize remediation efforts. For example, once transaction module 130 has received the transaction reports from each network device 140 processing a transaction request and generated a transaction flow report, resiliency program 138 may utilize one or more fields associated with each transaction report to identify and prioritize operational errors.

In some embodiments, an enterprise may prioritize an operational error according to the user affected by the error. Each transaction report may include a user ID field indicating the login name of the user requesting the transaction. An enterprise may have one or more tiers that its customers may be members of (e.g., loyalty programs, preferred customer programs, etc.), and/or the enterprise may designate specific user IDs as critical. For example, an enterprise may be an online retailer. The online retailer may designate customers that spend more than a predetermined amount per month (e.g., $250, $500, $1000) on the retailer's website as critical users. If transaction module 130 determines that an operational error occurred during the processing of a critical user's transaction, resiliency program 138 may assign the operational error a high priority status. Transaction module 130 may then operate to notify the responsible network administrator that an error occurred, the type of error that occurred, and the priority assigned to remediating that error.

As another example, an enterprise's website may provide a number of links that generate transaction requests. For instance, a website may have a login icon that a user may select to login to the enterprise's website. Other icons may be used to make purchases, navigate the website, update user contact information, check account information, or any other suitable actions. When processing the transaction based on the selected icon, each transaction report may include a request field indicating the URL resource name responsible for originating the transaction request. An enterprise may prioritize the importance of each icon offered by its website. For example, an enterprise may designate one or more URL resource names as critical (e.g., login URLs and payment URLs) while designating other URL resource names as secondary URL names (e.g., email update URLs). In this manner, an enterprise may identify an operational error and determine the priority of remediating the error based on the priority of the URL resource name generating the transaction request.

An enterprise may use any appropriate prioritization scheme. For example, an enterprise may rank the URL resource names based on frequency of use, the processing complexity required to handle the resulting transaction, and the location of the URL resource name on the enterprise's website. For example, transactions requested from the enterprise's homepage may receive a higher priority than transactions that are only available on internal pages.

In some embodiments, resiliency program 138 may categorize transaction requests into tiers based on the importance of the transaction request. An enterprise may designate any number of tiers for prioritization. For example, an enterprise may group the transactions into a first tier transaction, a second tier transaction, and a third tier transaction. When an operational error affects a first tier transaction, resiliency program 138 may assign the first tier transaction a higher priority level.

As another example, each transaction report may include a network device name indicating the network device responsible for processing the transaction request. An enterprise may categorize/rank network devices 140 used to process the transaction. An enterprise may rank network devices 140 using any suitable metric. For example, the enterprise may categorize each network device based on the device's remaining useful lifetime, the failover capability of the device (i.e., are there other devices that can maintain the processing of the network device should it fail), the number of transactions handled by the network device, the number of previous failures encountered by the device, or any other appropriate metric. For example, an enterprise may designate network devices 140 in the last year of their operational life expectancy as critical devices based on the likelihood of the device to fail. Resiliency program 138 may identify that network device 140*a* reporting an operational error is in its last year of operation and designate network device 140*a* as a critical device. Resiliency program 138 may designate the operational error as high priority based on the age of the device. In this manner, a network administrator may quickly respond to aging network devices.

In some embodiments, an enterprise may prioritize errors affecting one or more backend systems. For instance, each transaction report may include a backend call summary field identifying a backend system called by the network device to process the transaction request. The enterprise may categorize the backend systems using any suitable ranking. For example, each backend system may be designated as critical system priority, moderate system priority, or low system priority. If a transaction report indicates that a backend system reporting an operational error has a critical system priority, resiliency program 138 may designate the error as a high priority when reporting the error to the relevant network administrator.

As yet another example, each transaction report may include a duration field indicating a time period for the network device to process the transaction request. Resiliency program 138 may categorize the duration field based on the time period for the network device to process the transaction request. For instance, resiliency program 138 may categorize the duration as a duration failure, a duration caution, or duration acceptable. If the duration field is categorized as duration failure, resiliency program 138 may assign a high priority to the operational error associated with the duration field. If the duration field is categorized as duration caution, resiliency program 138 may instead assign a moderate priority to the operational error. This may allow a network administrator to distinguish between durational errors leading to transaction timeouts and durational errors having a longer than expected latency.

Using resiliency program 138 may allow an enterprise to not only identify operational issues occurring within its network, but also prioritize the issues and facilitate the operation of a more efficient network. In addition to identifying issues in a network, transaction module 130 may also be used proactively to map the network architecture so that network administrators may gain a better understanding of how the network operates and the interoperability of network devices 140.

Processor 134 may implement modeling program 139 to facilitate the mapping of network devices 140. For example, using GUI 122, a user may access modeling program 139 and communicate a map request to generate a network architecture map for a specific transaction. As explained in FIG. 6, the user may designate one or more features of the network architecture map for transaction module 130 to model. For example, the user may select the type of transaction to model and a network entry point for the transaction. Depending on the enterprise, a network entry point may be a webserver, a customer service terminal, an automatic teller machine (ATM), a checkout scanner, or any other suitable interface. In certain embodiments, modeling program 139 may allow a user to select one or more different kinds of system architecture maps to be generated. In some embodiments, a user may select a transaction that has already been tracked by tracing program 136 to generate a network architecture map.

As an illustration, to visualize how a transaction request to access a customer's account information is processed by an enterprise's network a user may communicate a map request to modeling program 139. The user may designate the transaction to be an account access transaction with the system entry point being a webserver. In some embodiments, the user may select a specific webserver or a specific server cluster location to be the network entry point. Modeling program 139 may then communicate the simulated transaction to the designated network entry point. As each network device 140 processes the transaction, each network device 140 communicates a respective transaction report to transaction module 130. Each transaction report may include a number of fields describing how each network device 140 processed the transaction. Transaction module 130 may then aggregate the transaction reports to create a transaction flow report. Depending on the types of fields included in each transaction report and the type of network architecture map requested, modeling program 139 may then generate a network architecture map using the information provided by the transaction flow report.

In some embodiments, a network architecture map may illustrate the size of the data packets communicated between network devices 140. For example, each transaction report may include a response size field indicating a size of a response returned by each network device 140. The network architecture map may include the size of each data packet communicated between network devices 140 as each device processes a transaction. This may allow a user to visualize not only which network devices 140 process a transaction, but also the amount of data communicated between devices.

The network architecture map may also indicate the time taken by each network device 140 to process the transaction. Each transaction report may include a response time field indicating a time period for each of the plurality of network devices to process the transaction request. Furthermore, in some embodiments, each transaction report may include a timestamp field identifying a time and a date that each network device 140 received the transaction request. Network architecture map may include this timing information from the response time field and/or the timestamp field to illustrate the progression of a transaction through the network. This may allow a user to visualize transactions that are processed using network devices 140 in parallel. Similarly, users may also identify transactions that are processed asynchronously.

As another example, the network architecture map may illustrate the backend systems called by network devices 140 when processing the transaction. Each transaction report may include a backend call summary field identifying one or more backend systems called by each network device 140 processing the transaction request. The backend call summary field may further specify the backend method called, the time the backend method was called, and the duration of the backend call. The network architecture map may then illustrate each backend system called and network device 140*a* making the call.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the disclosure. For example, although illustrated as four separate programs, tracing program 136, troubleshooting program 137, resiliency program 138, and modeling program 139 may be part of the same program. Any suitable logic may perform the functions of system 100 and the components within system 100.

FIG. 2 is an example system 200 illustrating network devices 140 generating and communicating transaction reports to transaction module 130. System 200 includes network 110 that facilitates communication between workstation 120, transaction module 130, network devices 140, and user device 150.

In the illustrated embodiment, user device 150 communicates transaction request 210 to network device 140*a* acting as a network entry point. A network entry point may be any suitable device and/or software that receives transaction requests. For example, network device 140*a* may be a webserver that processes requests from web browsers using an HTTP protocol. In some embodiments, network device 140*a* may be an automatic teller machine (ATM) processing financial transactions and communicating with a financial enterprise's network. In some embodiments, network device 140*a* may be a customer service terminal attempting to troubleshoot errors encountered by a user.

Upon receiving transaction request 210, network device 140*a* may utilize unique identifier (ID) generator 220 to insert a unique header into transaction request 210. For example, network device 140*a* may be a webserver using an HTTP protocol. Unique ID generator 220 may inject the unique ID into the transaction request as an HTTP header. Unique ID generator 220 may be any suitable plug-in, software, or hardware operable to insert a unique identifier into a transaction request.

Network device 140*a* may then process transaction request 210 and determine whether any other network devices 140 are required to process transaction request 210.

For example, a financial institution may allow their customers to check their account balances online. A user may login to the financial institution's website provided by network device 140a acting as a webserver. A user may then check their account balance by clicking on an account balance icon provided on the website. Network device 140a may receive transaction request 140a to access the user's account status and inject transaction request 210 with a unique identifier. Network device 140a may then communicate first transaction command 240 to network device 140b which may represent an application server running the financial institution's business logic while managing data stored in one or more databases.

Network device 140b may receive first transaction command 240 including the unique ID injected at network device 140a. Network device 140b may then process transaction command 240 to retrieve the user's account details. Network device 140b may make a number of frontend and backend calls to network devices 140 to process first transaction command 240. For example, network device 140b may communicate with a database comprising user account statuses represented by network device 140n. In some embodiments, network device 140n may operate as a relational database management system (RDBMS). Network device 140b may utilize an SQL protocol to communicate second transaction command 260 to network device 140n to retrieve the user's account status.

Before communicating second transaction command 260, network device 140b may retrieve the unique ID received as part of transaction command 240 and insert the unique ID as part of second transaction command 260. In this manner, the same unique ID may follow a transaction request from one network device to another as the request is being processed. Furthermore, because each network device retrieves the unique ID from the previous request and inserts it into subsequent requests based on the subsequent protocol, any number of hardware and software devices may be utilized by an enterprise to process a transaction while maintaining the ability to track the transaction through the network.

Network device 140n may then receive and process the second transaction command 260. For example, network device 140n may retrieve the user's account information and return the information to network device 140b. Network device 140b may then return the requested account information to network system 140a, which may communicate the account information to the user's web browser.

Each network device 140a, 140b, and 140n may generate and communicate a transaction report 230, 250, and 270, respectively, to transaction module 130. As described in FIG. 3, each transaction report may include a number of fields detailing how each network device 140 processed transaction request 210 (or subsequent first transaction command 240 and second transaction command 260).

Each transaction request may include the unique ID assigned to transaction request at network device 140a acting as the network entry point. Other fields may include a timestamp of when each network device 140 received transaction request 210 (or the subsequent transaction commands 240 and 260), the time period it took each network device to process transaction request 210, the size of the data returned by each network device, and a status report of how transaction request 210 was handled.

In some embodiments, the transaction reports are communicated asynchronously as each network device 140 completes its respective task. In some embodiments, the transaction reports are communicated synchronously when transaction request 210 is completed.

In certain embodiments, to conserve resources and increase the efficiency of reporting, each transaction report may be condensed and communicated to transaction module 130 as a single, "one-line" string. This may significantly reduce the storage requirements for enterprises that handle millions of transaction requests each day. Transaction module 130 may receive each transaction report (i.e., 230, 250, and 270) for transaction request 210 and aggregate each transaction report using the unique ID, to create a transaction flow report. As described in FIGS. 4 and 5, a transaction flow report may allow a user accessing the transaction flow report through GUI 122 to see how each transaction request was processed, which network devices 140 were utilized and, if an error occurred, at which network device 140 it occurred.

Modifications, additions, or omissions may be made to system 200 without departing from the scope of the disclosure. For example, although illustrated as user device 150 communicating directly with network device 140a, user device 150 may communicate with network device 140a using network 110. Similarly, workstation 120 may communicate with transaction module 130 using network 110. In some embodiments, the functionality of a webserver and an application server may be included in a single device. Furthermore, in certain embodiments, network devices 140 may utilize messaging middleware software (e.g., IBM MQ) to integrate multiple network devices 140 and applications. While described using HTTP and SQL, any suitable protocol may be utilized in system 200 including but not limited to Java, PHP, C#, C++, XHR, and JSON.

Figure 3:
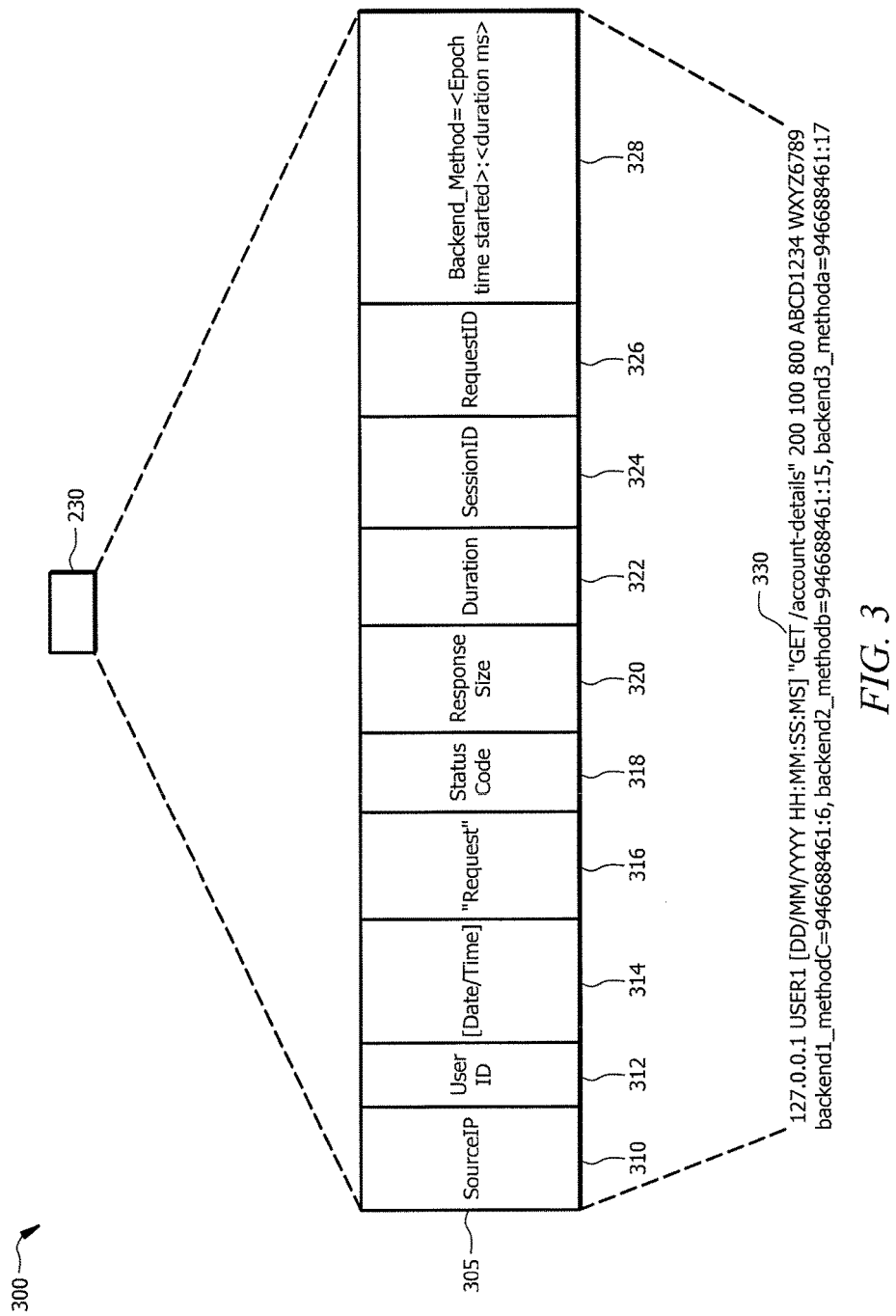
FIG. 3 is a block diagram showing an example transaction report from a network device.

FIG. 3 is a block diagram 300 showing an example transaction report 230 sent from network device 140a. Transaction report 230 may include a plurality of data describing the processing of transaction request 210 at network device 140a. For example, in the illustrated embodiment, fields 305 include source IP 310, user ID 312, time stamp 314, request 316, status code 318, response size 320, duration 322, session ID 324, request ID 326, and backend call summary 328. Fields 305 may be combined to form one-line transaction report 330 used by transaction module 130 to record how each network device 140 handles a transaction. Although described with fields 305, an enterprise may customize transaction report 230 to include any information relevant to the services the enterprise provides.

Source IP 310 may describe an address of the network device that sent transaction request 210 to network device 140a. Source IP 310 may be any information that describes the address/location of the source. For example, network device 140a may be an application server receiving a request to execute a program from a webserver. Source IP 310 may include TCP/IP information such as an IP address of the webserver. In some embodiments, the source of a request may come from other devices such as ATM or a customer service representative for the enterprise using workstation 120. Source IP 310 may describe the physical address of ATM or it may include a unique ATM number to identify ATM 160. Accordingly, Source IP 310 may be useful if certain devices are malfunctioning causing erroneous requests to be sent to network devices 140.

User ID 312 may describe a user name of a user associated with transaction request 210. For example, a user may setup an account with an enterprise through the enterprise's website (e.g., "USER1"). By including user ID 312 in transaction report 230, transaction module 130 may be able to identify the transactions requested by specific users. User ID 312 may also allow an enterprise to differentiate between users that share user device 150, such as a home computer.

User ID 312 may aid troubleshooting user issues by identifying specific transactions taken by a user.

Time stamp 314 may identify a date and time that network device 140a received transaction request 210. Time stamp 314 may be in any appropriate timing protocol. For instance, time stamp 314 may in Greenwich Mean Time (GMT), Coordinated Universal Time (UTC), or any other appropriate timing protocol. Time stamp 314 may be generated in any appropriate manner, such as by the operating system of network device 140a. In some embodiments, time stamp 314 may provide information on how long it took to transmit transaction request 210 through a network by comparing time stamp 314 to the time transaction request 210 was sent from a source network device. In this manner, time stamp 314 may act as a baseline to measure other transaction metrics.

Request 316 may provide information regarding the application or resource that the upstream network device is requesting. In some embodiments, request 316 is an HTTP method that indicates the action that network device 140a is to perform. Depending on the methods supported by network device 140a, these methods may include, but are not limited to, GET, HEAD, POST, PUT, DELETE, TRACE, OPTIONS, CONNECT, PATCH, TRACK, DEBUG, or any other appropriate method. In some embodiments, request 316 is generated by the HTTP header from transaction request 210. Request 316 may also include the URL of the transaction requested. For example, a user may be attempting to login to their account. Request 316 may include a URL indicating the login request as "/user-login." Including request 316 in transaction report 230 may allow an enterprise to identify what method network device 140a was processing during an operational failure.

Status code 318 may indicate the status of transaction request 210 at network device 140a. Any appropriate protocol may be used to indicate status code 316. For example, if transaction request 210 uses HTTP and network device 140a handles the method requested, then status code 318 may be "200." If network device 140a receives transaction request 210 but is unable to understand the request (e.g., incorrect syntax), status code 318 may be "400." In some embodiments, status code 318 may be generated by a Java servlet used by network device 140a. Consequently, transaction report 230 may succinctly describe the outcome of how network device 140a handles transaction request 210.

Response size 320 may indicate the size of a response sent back to the requesting source. This may be reported in any appropriate manner and may use any appropriate reference units. For example, a user may login to a financial institution's website and request the details of their account balance. Network device 140a may receive the request, retrieve the balance from a database, and return the account balance information to the requesting source. The data communicated back to the requesting source may be 100 bytes. Thus, response size 320 may be "100." Response size 320 may be generated by any appropriate program, such as a Java servlet. Accordingly, response size 320 may help diagnose issues occurring in a network by identifying the size of data transferred between network devices 140 to determine if the amount of data being transferred is appropriate for transaction request 210.

Duration 322 may indicate the total time it took network device 140a to process transaction request 210. In some embodiments, this may include the time of one or more back end calls handled by network device 140a. In certain embodiments, each backend call may have its own transaction report identifying fields 305. Duration 322 may be reported in any appropriate manner such as the number of milliseconds it took to service transaction request 210. Accordingly, a user troubleshooting an operational issue in an enterprise's network may look at duration 322 to determine whether transaction request 210 was handled within an acceptable time period.

Session ID 324 may identify one or more of the transactions requested by a user while the user is logged into an enterprise's website. For example, an enterprise may provide a website that allows users to browse through merchandise, login to a personalized account, and make online purchases. A user may login to their account with a first transaction request. The user may browse through merchandise creating a number of transaction requests as the user navigates the enterprise's website. The user may then select a piece of merchandise to purchase and use a credit card stored with the enterprise to pay for the merchandise. The user may then log out of the website after completing the purchase. In some embodiments, a session ID 324 is generated once the user logs in to the website and may be inserted into the header of each transaction request made by the user. The same session ID 324 may be included in each transaction request made during the user's session until the user logs out. Thus, an enterprise may identify all the actions a user took while they were logged in. If a user has trouble using the website (e.g., receives a payment error message), the enterprise may be able to look through the actions taken by the user to see where the error in the system occurred. As explained in FIG. 4, this may provide a "horizontal" view of a user's transaction requests made during a session.

Request ID 326 may represent the unique ID associated with an incoming transaction request. Depending on the number of transactions handled by an enterprise, request ID 326 may be any appropriate length and combination of numbers, symbols, and letters to reduce the likelihood of two transactions having the same unique identifier. For example, request ID 326 may be a URL safe (e.g., "a-z," "A-Z," "0-9," "-," and "_"), alpha-numeric identifier.

In some embodiments, request ID 326 is injected into the header of transaction request 210 by an entry network device (e.g., a webserver) and be passed to each network device 140 utilized to carry out a transaction request. As described in FIG. 2, each network device 140 may then communicate respective transaction reports to transaction module 130. Transaction module 130 may then aggregate transaction reports having the same request ID 326 to link together each transaction report generated by each network device 140. Thus, while session ID 324 may represent the horizontal view of a user's transaction requests while logged in to a website, request ID 326 may represent the "vertical" view of a specific transaction request.

Backend call summary 328 may include information regarding the backend calls made by network device 140a when handling transaction request 210. Backend call summary 328 may include information such as the name of the backend system called, the method performed by the backend system, the time the backend call was initiated, and the time the backend system took to process the call. The time the backend call was made may be recorded in any appropriate manner. For example, the time may be recorded in epoch (Unix) time.

If more than one backend call is made by network device 140a, backend call summary 328 may string the backend call information together. For example, each backend call may be separated by a comma and the entire string may represent backend call summary 328. In this manner, each backend call made by network device 140a may be included in transaction report 230. This may allow a user diagnosing a network issue to determine not only how network device 140a handled a transaction request but also whether backend calls made by network device 140a processed the request efficiently and without error.

In some embodiments, fields 305 may be combined to form a single, "one-line" transaction report. As an illustration, one-line transaction report 330 is an example report that may be generated by network device 140 handling transaction request 210. Source IP 310 may be recorded as 127.0.0.1; user ID 312 may be recorded as USER1; and time stamp 314 may be recorded as [DD/MM/YYYY HH:MM;SS:MS]. Request 316 may be for a GET method and the transaction type may be for a user accessing their account details. Network device 140a may successfully handle the transaction and return 200 as status code 318. The account details returned to the requesting source may have been 100 bytes and network device 140a may have completed the transaction in 800 milliseconds. The request for account details may have been one of multiple transaction requests all identified by a common session ID 324, and indicated by ABCD1234. The specific transaction request for the account details may have request ID 326 indicated as WXYZ6789. Finally, to handle transaction request 210, three backend calls may have been made as indicated by backend call summary 328.

Depending on the number of transactions handled by an enterprise's network, millions of transaction reports 230 may be generated in a short time period. By condensing transaction report 230 to one-line transaction report 330, an enterprise may efficiently monitor and troubleshoot issues occurring in the enterprise's network. Furthermore, the enterprise may achieve a significant reduction in the memory needed to store the reporting of transaction requests.

Modifications, additions, or omissions may be made to block diagram 300 without departing from the scope of the disclosure. For example, fields 305 may also include a geographic address indicator for the network device. Thus, in addition to the virtual (i.e., IP address) location of network devices 140, one-line transaction report 330 may also indicate the physical location of network device 140a. This may allow system administrators to visualize how data is communicated through an enterprise's network and discover if certain locations (e.g., server farms) are more efficient at processing data than other locations.

Figure 4:
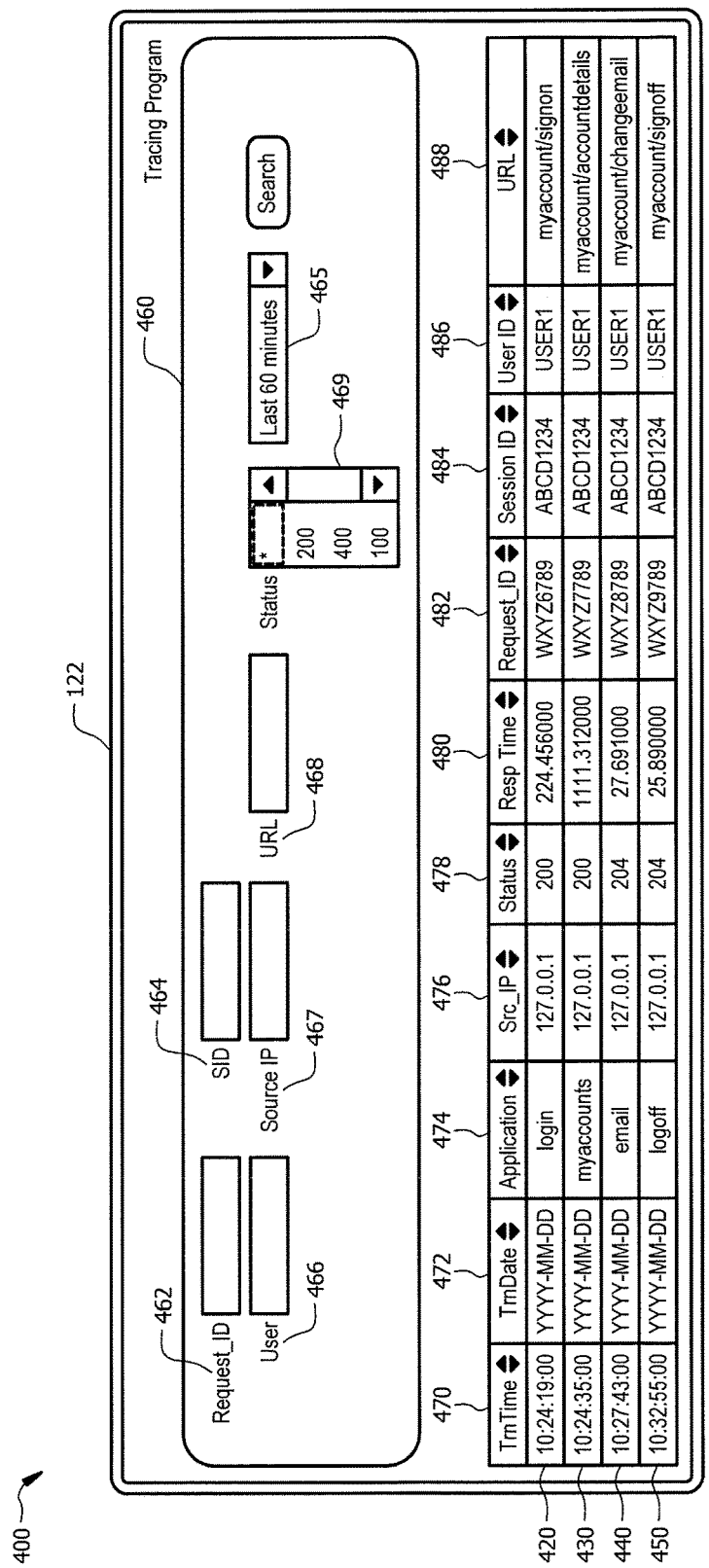
FIG. 4 is a screenshot of an example session flow report.

FIG. 4 is a screenshot of an example session flow report 400. Session flow report 400 may display each transaction requested by a user while the user was logged into the enterprise's website. In the illustrated embodiment, session flow report 400 includes login transaction 420, account transaction 430, email transaction 440, and signoff transaction 450. Each of these transactions may be linked together using the session ID assigned to each transaction when the user logged into the website. Each transaction in a session may be displayed in chronological order (or reverse chronological order) to illustrate the order a user requested each transaction. Furthermore, search bars 460 may allow for efficient troubleshooting of issues by searching for key terms.

Session flow report 400 may display any appropriate data associated with each transaction. For example, in the illustrated embodiment, session flow report 400 includes transaction time 470, transaction date 472, application 474, src_IP 476, status 478, response time 480, request ID 482, session ID 484, user ID 486, and URL 488. The information for this data may be pulled from the transaction reports comprising each transaction 420, 430, 440, and 450.

Transaction time 470 and transaction date 472 may represent the time and date that a specific transaction occurred. For example, in the illustrated embodiment, the user requested to log into the enterprise's website using login transaction 420 and 10:24:19:000 on YYYY-MM-DD. The user then requested their account details using account transaction 430 sixteen seconds later at 10:24:35:000. The user viewed their account, and three minutes and eight seconds later at 10:27:43:000, the user updated their email address using email transaction 440. Finally, the user logged off the enterprise's website at 10:32:55:000. In some embodiments, an enterprise may utilize this timing information to calculate important metrics like how long users spend on the website, which transactions are the most requested, the time of day that user's login, and the busiest and slowest days.

Application 474 may indicate the application or program performing the functionality and making the network device 140 calls to perform the transaction request. For instance, account transaction 430 may utilize a program called "myaccounts," which may handle requests made by users to access their account details. Similarly, when the user updates their email address using email transaction 440, "email" program may execute the transaction request. This may allow an enterprise to discover whether an error responding to a transaction request is a network device 140 error or an application error. In some embodiments, transaction module 130 may track the number of errors associated with each application to allow an enterprise to view which applications are generating the most failed transaction requests.

Src_IP 476 may identify the IP address of the network entry device that receives the transaction request from the user and inserts the unique identifier into the request. For example, src_IP 476 may identify the IP address of a webserver providing the enterprise's website to users. This may allow an enterprise to determine whether a specific IP address is the source of network errors or whether the network errors are decentralized. If the errors are originating from the same IP address, this may indicate an improper network connection between the network entry device and one or more downstream network devices 140.

Status 478 may indicate whether the transaction request was completed successfully. For instance, login transaction 420 may return a "200" as status 478 indicating that the transaction was successful and that the proper information (i.e., depending on the method used) was returned. As another example, logoff transaction 450 may return a "204" as status 478 indicating that the transaction was successful and that there is no information to return. Providing status 478 with each transaction allows a user troubleshooting a network error to quickly determine which transaction is returning an error (e.g., 4xx). As will be seen in FIG. 5, the specific transaction causing the network error may be selected and each network device 140 processing the transaction can be analyzed.

Session flow report 400 may also include response time 480 indicating the total time for the network to process a transaction. For example, the network was able to process login transaction 420 in 224.456 milliseconds while it took 1111.312 milliseconds to process account transaction 430. In some embodiments, response time 480 may be the cumulative response times for each of the transaction reports comprising the specific transaction. In some embodiments, response time 480 may be the duration field 322 reported by the transaction report for the entry level device. Response time 480 may allow a troubleshooter to quickly identify transactions that have timed out or are operating inefficiently. When combined with other data fields, this may allow the troubleshooter to identify network devices 140 that are malfunctioning or operating slowly. An enterprise may update or replace these devices to increase the efficiency of their network.

Request ID 482 and session ID 484 are utilized by transaction module 130 to link together transactions vertically by network device 140 and horizontally by session transactions. While request ID 482 may change for each transaction type, session ID 484 may remain the same for each transaction requested during the user's session. For example, network device 140*a* may assign login transaction 420 the unique ID "WXYZ6789" and session ID "ABCD1234." Network device 140*a* may assign account transaction 430 a different unique ID, "WXYZ7789," and maintain the same session ID "ABCD1234." In this manner, transaction module 130 may link together individual transactions vertically as well as horizontally by session.

This may provide a number of advantages when troubleshooting an operational error in a network. A network administrator may be able to see each transaction that a user performed and which transactions failed. This may also allow the network administrator to view how the user navigated the enterprise's website and understand which links were not operating properly.

User ID 486 may display the login name used to login to the enterprise's website. This may be useful for customer service if a user calls to report issues with the enterprise's website. Transaction module 130 may allow a person troubleshooting the user's issue to type the users login name into user search bar 466 and see each of the transactions made during a session.

URL 488 may indicate the resource link that a user clicked on to perform the transaction request. For example, to perform login transaction 420 a user may select a login button on the enterprise's website. This may have URL 488 "myaccount/signon." Similarly, account transaction 430 may display "myaccount/accountdetails" for URL 488.

Search bars 460 may allow for the targeted troubleshooting of transactions. In the illustrated embodiment, search bars 460 may include request ID bar 462, session ID (SID) bar 464, user bar 466, source IP bar 467, and URL bar 468. In some embodiments, search bars 460 may also include status bar 469 and time bar 465.

Request ID bar 462, SID bar 464, user bar 466, source IP bar 467 and URL bar 468 may all correspond to their respective data columns. For example, a user may troubleshoot a network issue created by a specific webserver. If the troubleshooter knows the IP address of the webserver, the troubleshooter may input the IP address in source IP bar 467 to bring up each transaction handled by the webserver. The troubleshooter may then use status bar 469 to filter by transactions having status 478 indicating a bad request (e.g., "400"). This may allow the troubleshooter to quickly identify all transactions from a specific webserver resulting in a specific network failure.

In some embodiments, a troubleshooter may analyze how a specific URL is responding to network traffic. The troubleshooter may use URL bar 468 to filter by a specific URL and then may adjust time bar 465 to return all transactions using the specified URL for the selected time period. This may allow a troubleshooter to analyze how a URL is responding to updates or changes to the enterprise's website or application using the URL.

Modifications, additions, or omissions may be made to block diagram 300 without departing from the scope of the disclosure. For example, session flow report 400 may include a host ID number identifying a server location handling a specific transaction. This may allow a user to identify where the transaction is occurring geographically. Session flow report 400 may also indicate the performance optimized datacenter (POD) where the transaction is being handled. In some embodiments, an enterprise may create a lifetime session ID that tracks each transaction request ever made by a user.

Figure 5:
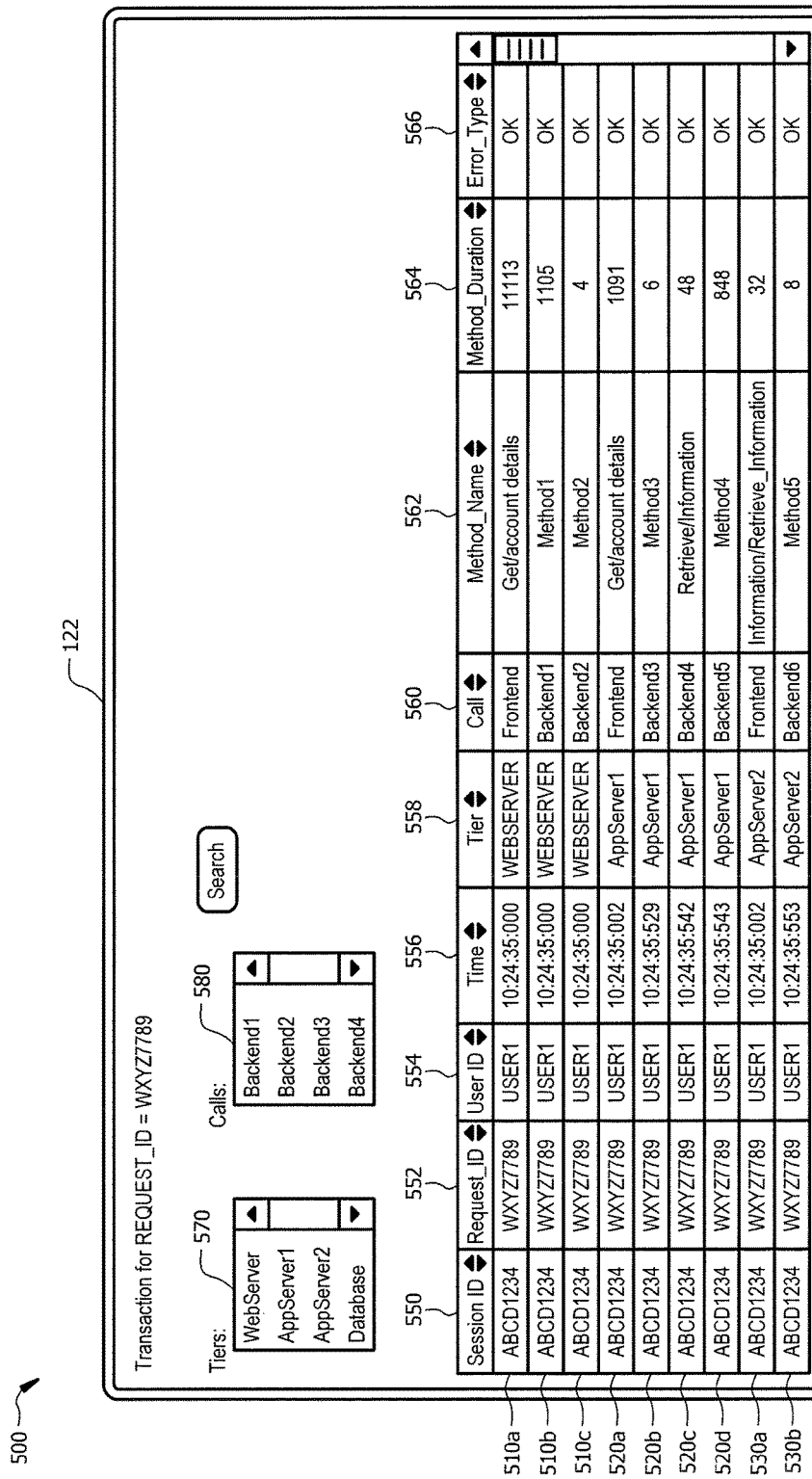
FIG. 5 is a screenshot of an example transaction flow report.

FIG. 5 is a screenshot of an example transaction flow report 500 of account transaction 430. Transaction flow report 500 may display a plurality of transaction reports received from each network device 140 used to process account transaction 430. In the illustrated embodiment, transaction flow report 500 includes webserver report 510, first application server report 520 and second application server report 530. Each transaction report may include one or more backend calls made by each network device 140 processing account transaction 430. Although not shown, one or more additional transaction reports may be included in transaction flow report 500.

In some embodiments, each transaction report received by transaction module 130 may be linked together using the unique ID (e.g., WXYZ7789) assigned to account transaction 430 by the network entry device. Transaction module 130 may receive a number of transaction reports and aggregate the transactions having the same unique ID. GUI 122 may allow a user to filter various data fields in transaction flow report 500 using tier filter 570 and call filter 580. Transaction flow report 500 may also display the data included in each transaction report. In some embodiments, transaction flow report 500 may list each transaction in chronological order (or reverse chronological order) to illustrate how account transaction 430 was handled by each network device 140.

In the illustrated embodiment, transaction flow report 500 comprises a number of transaction reports including webserver report 510, first application server report 520 and second application server report 530. Transaction flow report 500 may also display a number of fields for each transaction report including session ID 550, request ID 552, user ID 554, time 556, tier 558, call 560, method name 562, method duration 564, and error type 566.

Because each of the illustrated transaction reports (510, 520, and 530) are part of the same session, each transaction report may have the same session ID, ABCD1234. Similarly, because each of the illustrated transaction reports are part of account transaction 430, each transaction report may have the same unique ID, WXYZ7789. Furthermore, because the transaction reports are for the same transaction request, account transaction 430, user ID field 554 may list the same user name, USER1.

By including backend call summary 328 in transaction reports, each transaction report (510, 520, and 530) may display a frontend call and one or more backend calls made by each network device 140. For example, webserver report 510 comprises frontend webserver report 510*a*, first backend report 510*b*, and second backend report 510*c*. First application server report 520 comprises frontend first application server report 520*a*, third backend report 520*b*, fourth backend report 520*c*, and fifth backend report 520*d*. Second application server report 530 includes frontend second application server report 530*a* and sixth backend report 530*b*. Thus, although webserver report 510 may communicate a single transaction report, transaction module 130 is able to display relevant data about each backend system called by the webserver while processing account transaction 430.

For example, frontend webserver report 510a may receive account transaction 430 on DD/MM/YY at 10:24:35:000 as indicated by date field 556. Tier field 560 may indicate that the network device 140 processing account transaction 430 is a webserver and call field 560 indicates that the processing is done based on a frontend call. Method name field 562 may specify the type of command processed in the frontend call, "GET/account-details.go." Method duration field 564 may display that it took 1111.3 milliseconds to process the transaction request for account transaction 430 and error type field 566 indicates that the transaction request was performed successfully (e.g., "ok").

As another example, fourth backend report 520c indicates that first application server made a call to a fourth backend system on DD/MM/YY at 10:24:35:542 as indicated by date filed 556. Tier field 558 and call field 560 specify that first application server makes the call to the fourth backend system, respectively. Method name field 562 tells the user that the method command sent to the fourth backend system was a retrieve information command. According to method duration 564 the call was processed in 48 milliseconds and error type field 566 indicates that the call was completed successfully.

In certain embodiments, a backend call from a first network device 140a may lead to a frontend call for second network device 140b. For example, in the illustrated embodiment, call field 560 for first backend report 510b indicates that webserver called backend system one and method duration field 564 indicates that the call to backend system one took 1105 milliseconds. This call to backend system one may represent a call to the first application server represented by first application server report 520.

For synchronous backend calls, GUI 122 may allow a user to determine the network latency time involved in completing a backend call. Network latency time may represent the time between when a frontend system calls a backend system and the time it takes the backend system to complete the transaction request. For example, method duration field 564 of first backend report 510b indicates that a call to the first backend system took 1105 milliseconds. However, method duration field 564 for frontend first application server report 520a indicates that the call was processed in 1091 milliseconds. In certain embodiments, this may indicate a network latency time of 14 milliseconds.

Identifying network latency may help diagnose slow backend calls or identify frontend systems making calls to backend systems that are geographically dispersed, leading to longer communication responses. This may allow a network administrator to identify closer network devices 140 that can be called and respond to front end system calls quicker.

Using GUI 122 a user may inspect time field 556, call field 560, and method duration field 564 to understand how each network device 140 interacts and calls subsequent network devices 140. This may allow a user to see that, based on webserver report 510, two backend calls are made in parallel at substantially the same time (i.e., 10:24:35:000).

Modifications, additions, or omissions may be made to transaction flow report 500 without departing from the scope of the disclosure. For example, transaction flow report 500 may include a host name identifying a server or database location handling a specific transaction. This may allow a user to identify where the transaction is occurring geographically and determine if a closer network device 140 may handle the transaction request. This may lead to efficiencies in the processing of transaction requests.

Figure 6:
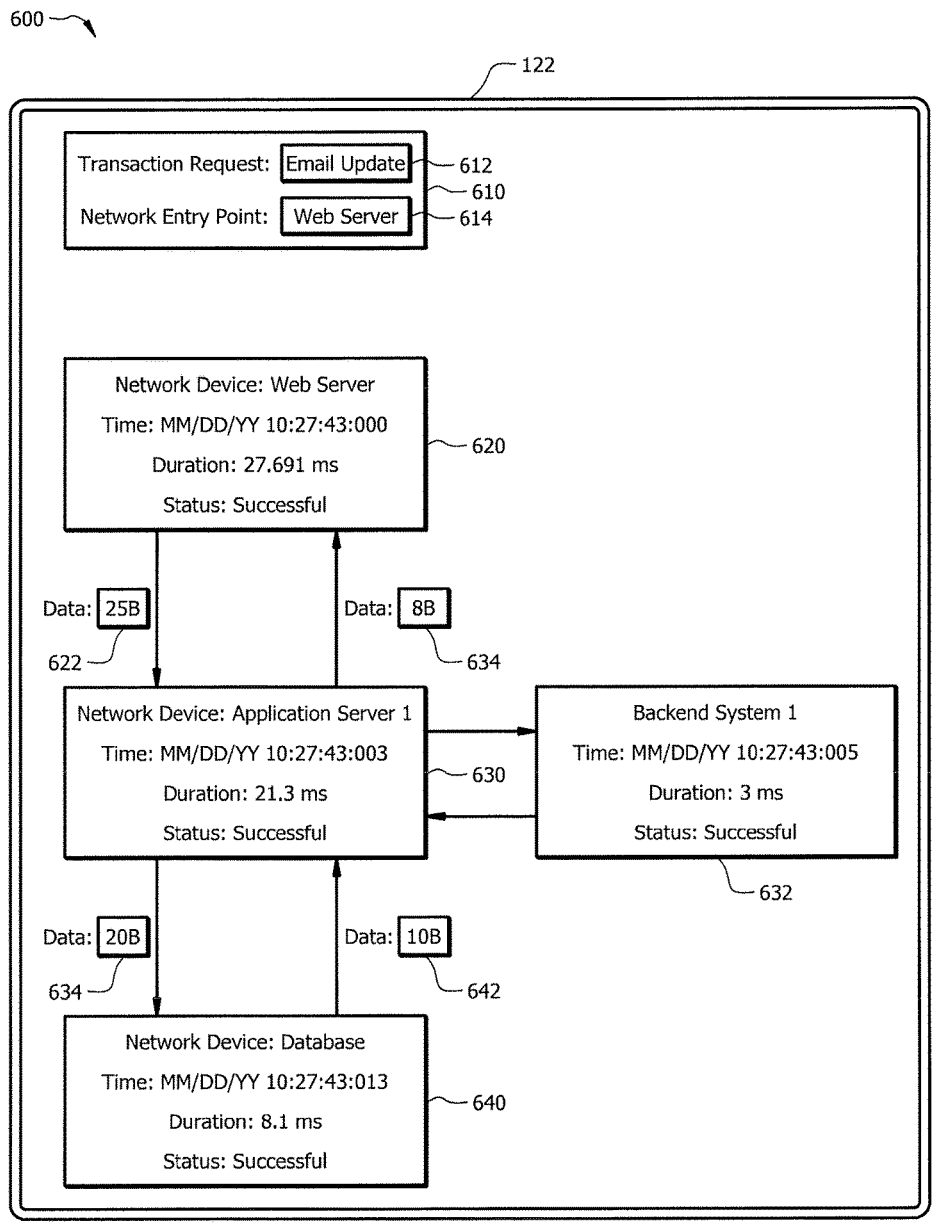
FIG. 6 is an example network architecture map illustrating an example transaction flow of a transaction request.

In certain embodiments, it may be advantageous to illustrate transaction flow report 500 in other embodiments to allow a user to easily understand how one or more network devices 140 interact and process information. FIG. 6 is an example network architecture map 600 illustrating the processing of email transaction 440.

In the illustrated embodiment, network architecture map 600 is a flow chart showing each network device 140 used to process a transaction request. Network architecture map 600 may include map request settings 610 that comprise transaction request input 612 and system entry point input 614. This may allow a user to generate system architecture map 600 for a number of different transaction requests and entry points.

In some embodiments, a network administrator may wish to identify how an account details request is processed when the request originates from an ATM instead of a web browser. Map request settings 610 may have any number of customizable features such as selecting specific network devices 140 to process a transaction and selecting specific server clusters or server farms to process a request. In some embodiments, a user may generate a network architecture map 600 by selecting a specific transaction from session flow report 400.

For example, in the illustrated embodiment, a user may wish to generate a network architecture map for email transaction 440 to visualize how an email address is updated in the enterprise's network. First network representation 620 may indicate that a webserver received email transaction 440 at MM/DD/YY at 10:27:43:000 and successfully processed the transaction in 27.691 milliseconds.

Second network representation 630 may indicate that application server one received 25 bytes of data from the webserver as shown by first data representation 622. Second network representation 630 may also specify that application server one received the transaction request on MM/DD/YY at 10:27:43:0003 and took 21.3 milliseconds to successfully process the transaction. Application server one may return 8 bytes of data to the webserver as indicated by fourth data representation 634.

System architecture map 600 may also show that application server one called backend system one as represented by third network representation 632. Third network representation 632 may specify that backend system one was called on MM/DD/YY at 10:27:43:005 and successfully completed the call in 3 milliseconds.

Fourth network representation 640 indicates that a database received 20 bytes of data from application server one as shown by second data representation 634. Database may have received the transaction request on MM/DD/YY at 10:27:43:013 and successfully handled the transaction in 8.1 milliseconds. Database may return 10 bytes of data to application server one as indicated by third data representation 642.

In this manner, system architecture map may illustrate each network device 140 utilized by a transaction request, the time and duration it took each device to process the request, and the amount of data transferred between network devices 140 to process the request.

Modifications, additions, or omissions may be made to system architecture map 600 without departing from the scope of the disclosure. For instance, although illustrated as a flowchart, any suitable network architecture map 600 may be used to illustrate account transaction 430. For example, modeling program 139 may generate a waterfall map to illustrate the communications made between a user and a network entry point. This may allow a network administrator to visualize how data is being called and communicated to a user through an enterprise's website.

As another example, network architecture map 600 may be a three dimensional representation of the processing performed by network device 140a when handling a specific transaction request. For example, a chart may graph the data returned by network device 140a on an x-axis, the time it took network device 140a to process the transaction request on a y-axis, and the number of backend systems called by network device 140a to process the transaction. In this manner, network architecture map 600 may illustrate the performance of network device 140a compared to other network devices 140b-n performing the same processing. This may allow a network administrator to quickly analyze whether network device 140a is performing in-line with other devices or whether it should be updated or replaced.

Figure 7:
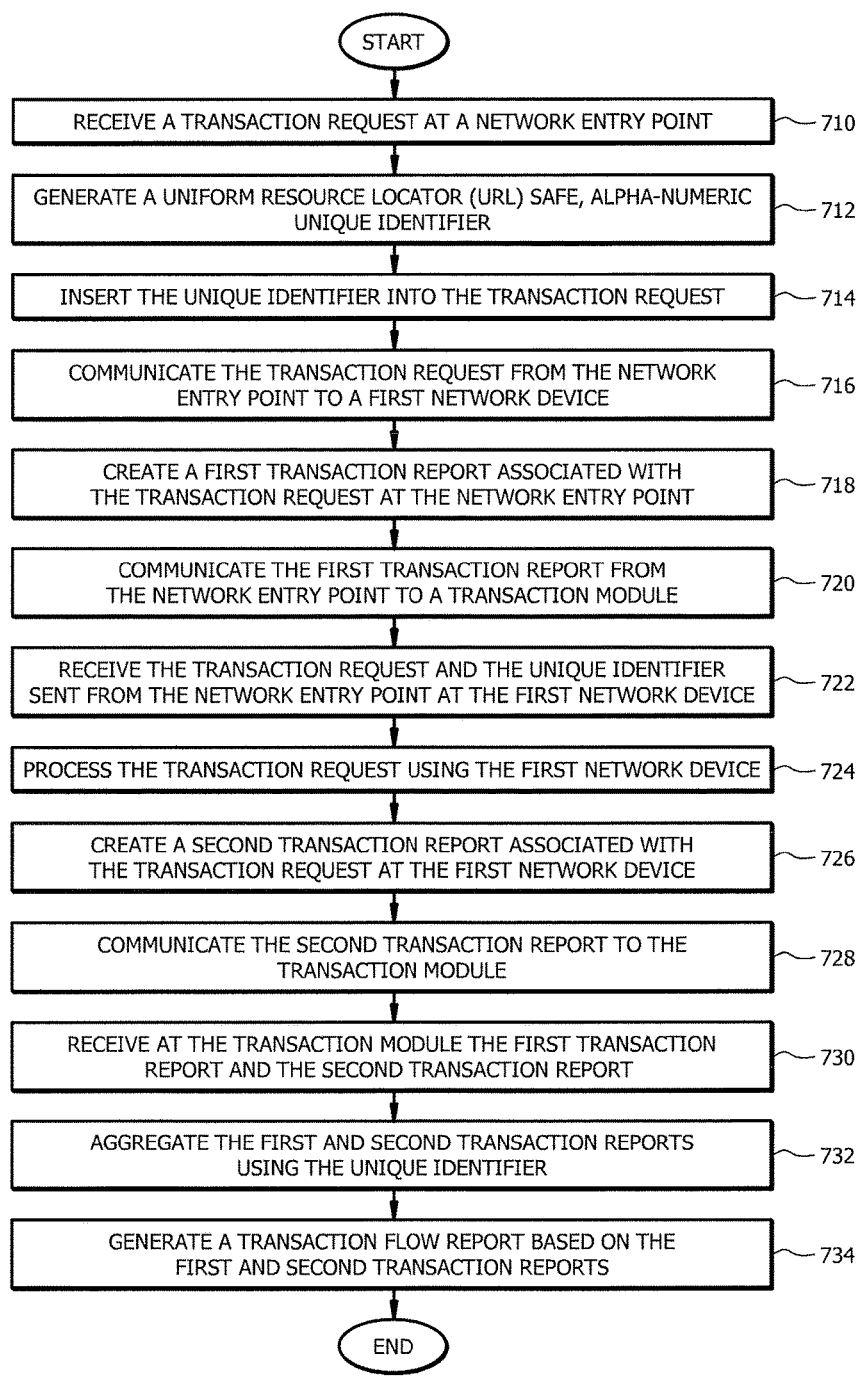
FIG. 7 is a flowchart illustrating an example method of transaction tracking.

FIG. 7 is a flowchart illustrating an example method 700 of transaction tracking. At step 710, network entry point 140a receives a transaction request 210. In some embodiments, network entry point 140a may be a webserver communicating with a web browser using HTTP. In some embodiments, network entry point 140a may be an ATM facilitating an electronic transaction between a user and a financial institution.

At step 712, network entry point 140a generates a URL safe, alpha-numeric unique identifier. The unique identifier may be any appropriate length and combination of numbers, symbols, and letters (e.g., "a-z," "A-Z," "0-9," "-," and "_"). In some embodiments, a Java servlet is operating on network entry point 140a and is utilized to generate the unique identifier.

At step 714, network entry point 140a may insert the unique identifier into transaction request 210. For example, if network entry point 140a is a webserver communicating with a web browser, the unique identifier may be inserted into transaction request 210 as a header field. This may allow the unique identifier to pass from network devices 140 as transaction request 210 is processed by the network.

At step 716, network entry point 140a may communicate transaction request 210, including the unique identifier, to first network device 140b. Based on transaction request 210, network entry point 140a may utilize a number of downstream network devices 140 to process transaction request 210. For example, transaction request 210 may be a request by a user to access the user's account details. To access the user's account details, network entry point 140a may communicate the request to one or more application servers and databases to obtain the requested data. In some embodiments, network devices 140 may call one or more backend devices when processing transaction request 210.

At step 718, network entry point 140a may create first transaction report 230 associated with transaction request 718. First transaction report 230 may include a number of fields detailing how network device 140a processed transaction request 210. For example, a transaction request may include a request identifier comprising the unique identifier inserted into transaction request 210. Other fields may include a request field comprising a task identifier and a URL resource name, a time stamp field indicating a date and a time that the first network device received the transaction request, a status code field indicating a status of the transaction request received by the first network device, and a duration field indicating a time period for the first network device to process the transaction request.

At step 720, network entry point 140a may communicate first transaction report 230 to transaction module 130. In some embodiments, first transaction report 230 may be condensed down into a single string when communicated to transaction module 130.

At step 722, first network device 140b may receive transaction request and the unique identifier from network entry point 140a, and at step 724, first network device 140b may process transaction request 210. In some embodiments, transaction request 210 received from network entry device 140a may indicate a method to be performed by first network device 140b, such as GET, POST, PUT, DELETE, CONNECT or any suitable command, and may depend on the communication protocol used by first network device 140b.

At step 726, first network device 140b may create second transaction report 250 associated with transaction request and at step 728, first network device 140b may communicate second transaction report 250 to transaction module 130. Second transaction report 250 may include the same field types used in first transaction report 230, but customized to describe the processing conducted by first network device 140b. In this manner, uniform reports may be communicated to transaction module 130.

At step 730, transaction module 130 may receive first transaction report 230 and second transaction report 250 and at step 732, transaction module 130 may aggregate first transaction report 230 and second transaction report 250 using the unique identifier. Because the unique identifier is injected at system entry point 140a and passed to each subsequent network device 140 processing transaction request 210, transaction module 130 may easily identify each transaction report based on the unique identifier.

At step 734, transaction module 130 may generate a transaction flow report based on the aggregation of first transaction report 230 and second transaction report 250. The transaction flow report may display the data included in fields of each transaction report. In some embodiments, the transaction flow report may list each transaction in chronological order (or reverse chronological order) to illustrate how transaction request 210 was processed by each network device 140.

Various embodiments may perform some, all, or none of the steps described above. For example, network entry device 140a may generate transaction report 230 once the processing of transaction request 210 is completed by the network. This may require network entry device 140a to wait to generate and communicate transaction report 230 until first network device 140b returns data back to network entry device 140a. Furthermore, additional network devices 140 may process transaction request 140 and communicate transaction reports to transaction module 130. In some embodiments, the fields included in a transaction report may be dependent on the type of transaction processed by the network. For example, if transaction request 210 is an indication that the user is logging off, and the user is not requesting any information from a database (e.g., account details), the transaction reports generated for the transaction request may omit fields such as the size of the data returned. In this manner, the transaction reports may be tailored to the reporting conducted.

Figure 8:
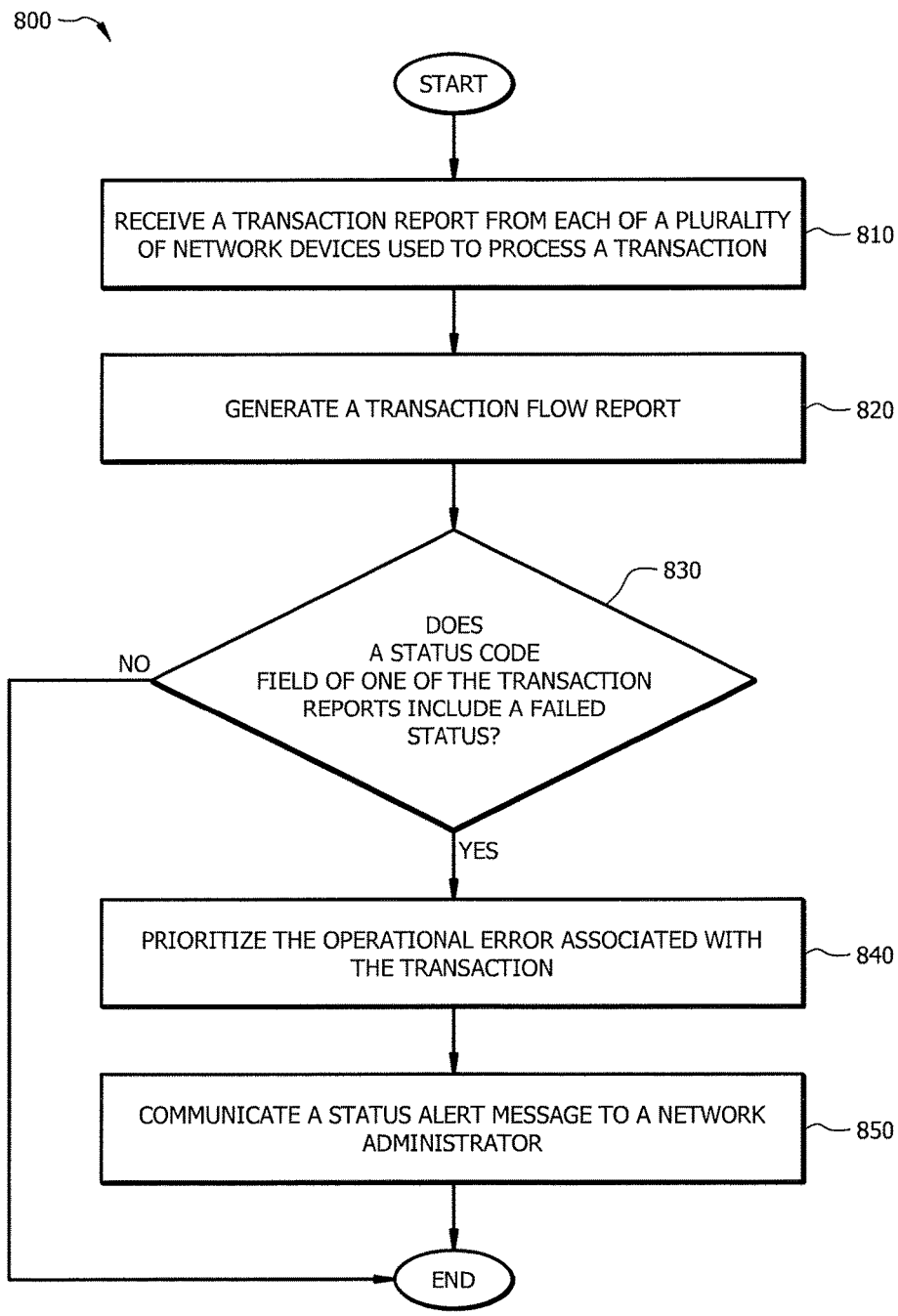
FIG. 8 is a flowchart illustrating an example method of troubleshooting and determining network resiliency.

FIG. 8 is a flowchart illustrating an example method 800 of troubleshooting an operational error and determining network resiliency. At step 810, transaction module 130 receives a transaction report from each of a plurality of network devices used to process a transaction. Each of the transaction reports may comprise a plurality of fields describing the processing of the transaction at each of the plurality of network devices 140.

In some embodiments, the plurality of fields may include a request identifier comprising a unique identifier inserted into transaction request 210 by network entry device 140a. Other fields may include a request field comprising a task identifier and a URL resource name, a time stamp field indicating a date and a time that the first network device received the transaction request, a status code field indicating a status of the transaction request received by the first network device, and a duration field indicating a time period for the first network device to process the transaction request. In some embodiments, the plurality of fields may also include a backend call summary including information regarding the backend calls made by each network device 140 when processing transaction request 210.

At step 820, transaction module 130 generates a transaction flow report that links each of the received transaction reports from the plurality of network devices 140 used to process transaction request 210. The transaction flow report may display the data included in the plurality of fields of each transaction report. In some embodiments, the transaction flow report may list each transaction in chronological order (or reverse chronological order) to illustrate how transaction request 210 was processed by each network device 140.

At step 830, transaction module 130 may determine whether a status code reported as one of the fields in each transaction report includes a failed status code, which indicates that an operational error occurred with one of the plurality of network devices 140 while processing transaction request 210. If transaction request 210 was processed without any errors the sequence may end. If an operational error is detected, the sequence may proceed to step 840. At step 840, transaction module 130 may prioritize the operational error associated with transaction request 210 by analyzing each of the plurality of fields associated with the transaction report indicating a failed status code.

For example, the plurality of fields reported by each transaction report may include a duration field indicating a time period for each of the plurality of devices to process transaction request 210. Transaction module 130 may identify the time period reported in the transaction report having the failed status report and compare the time period to an expected time period for the network device to process transaction report 210. Transaction module 130 may further categorize the duration field based on the identified time period reported. For example, if the reported time is more than 25% different than the expected time period for the network device 140 to process that type of transaction request, transaction module 130 may designate the time as a durational failure. If the reported time is within 10% and 25% of the expected time, then transaction module may designate the response time as cautious. If the response time is within 10% of the expected time then transaction module may designate the response time as acceptable. If transaction device 130 designates the response time as a failure, then transaction module 130 may determine that the failed status report is due to timing issue in the processing of transaction request 210.

As another example, the plurality of fields reported by each transaction report may include a backend call summary field identifying one or more backend systems called by each of the plurality of devices to process transaction request 210. Transaction module 130 may identify that a backend system called by the first one of the plurality of network devices failed to process the transaction request. Transaction module 130 may categorize the backend system as either a critical backend system, a moderate backend system, or a low priority backend system.

At step 850, transaction module 130 may communicate a status alert message to a network administrator associated with the one of the plurality of network devices 140 having the operational error. In some embodiments, transaction module 130 may also indicate a priority of the error to the network administrator.

For example, if transaction module 130 determines that the operational failure is due to a failed backend system call, and the backend system call is a critical backend system, transaction module 130 may indicate that the operational failure is a high priority and should be resolved quickly. If the backend system is instead a low priority system, transaction module 130 may indicate that the operational failure is a lower priority to remediate.

Various embodiments may perform some, all, or none of the steps of method 900. For example, transaction module 130 may troubleshoot and prioritize an operational error based on the user identified in a transaction report. Certain users may be designated as critical (e.g., users that frequently visit the enterprise's website, or spend more than a certain threshold of money on the enterprise's website). Transaction module 130 may indicate that a critical user is experiencing an error and attempt to remediate that user's transaction request issues quicker. An enterprise may also identify certain transactions as having a higher priority than other transactions. For example, an enterprise may assign requests to login to their website as high priority transactions, while transactions to update a user's email address may be designated as lower priority. This may allow a network administrator to prioritize issues based on the importance of the transaction experiencing the operational error.

Figure 9:
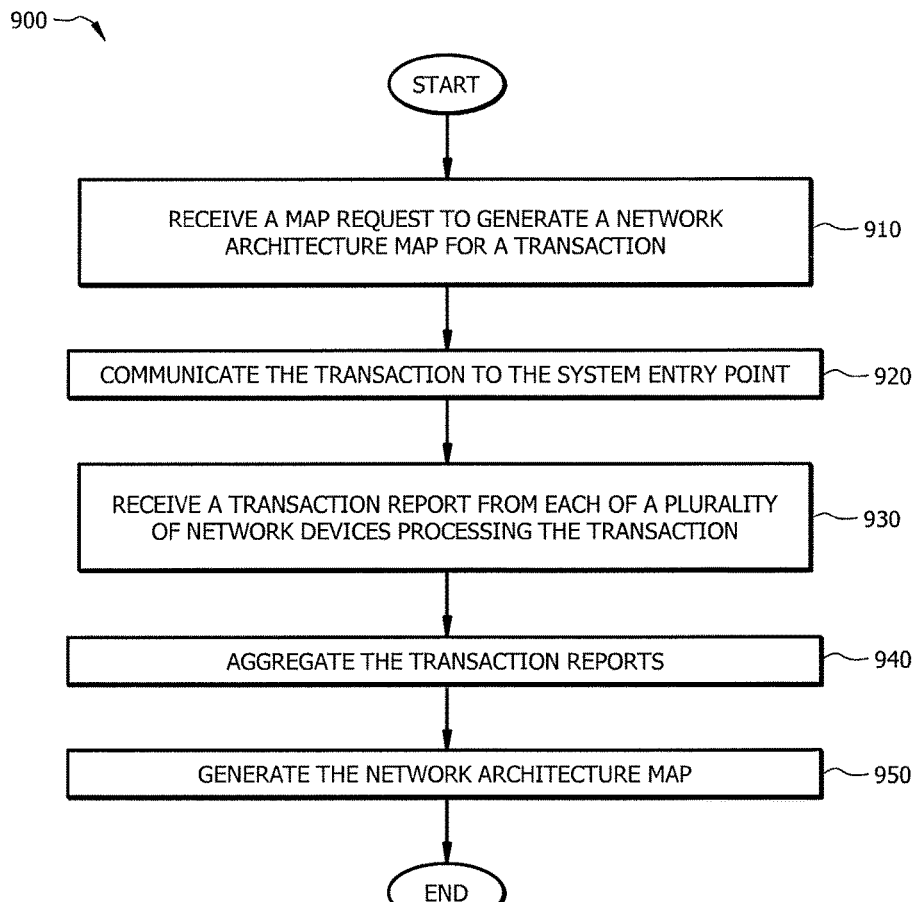
FIG. 9 is a flowchart illustrating an example method for generating a network architecture map.

FIG. 9 is a flowchart illustrating an example method 900 for generating a network architecture map.

At step 910 transaction module 130 receives a map request to generate a network architecture map for a transaction. In some embodiments, the map request specifies a transaction and a designation of a system entry point. At step 920, transaction module 130 may communicate the specified transaction to the designated system entry point. For example, a user may want to understand how an enterprise's network processes a request to login to the enterprise's website. The user may create a map request designating a login transaction request and a webserver as the system entry point. In some embodiments, the user may specify a specific webserver by IP address, geographic location, or server cluster. In some embodiments, the user may select multiple map requests to be processed at substantially the same time to understand how the same transaction is processed by different network entry points performing the same function. In this manner, a map request may allow a user to visualize and understand how transactions are handled by the network.

At step 930, transaction module 130 may receive a transaction report from each of a plurality of network devices processing the specified transaction. each transaction report may comprise a plurality of fields detailing how each network device 140 processed the transaction. Fields may include a request field comprising a task identifier and a URL resource name, a time stamp field indicating a date and a time that the first network device received the transaction request, a status code field indicating a status of the transaction request received by the first network device, and a duration field indicating a time period for the first network device to process the transaction request. In some embodiments, the plurality of fields may also include a backend call summary including information regarding the backend calls made by each network device 140 when processing a transaction.

At step 940, transaction module 130 may then aggregate each of the received transaction reports to create a transaction flow report. In some embodiments, transaction module 130 aggregates each of the transaction reports using a unique identifier included as a field in each transaction report. The unique identifier may be injected at the designated system entry point and passed to each network device 140 processing the selected transaction.

At step 950, transaction module 130 may generate a network architecture map using the transaction flow report and one or more of the fields reported from each of the transaction reports. For example, a user may indicate that network architecture map should be generated as a flow chart illustrating each network device 140 used to process the specified transaction. Each transaction report may include a response size field indicating a size of a response returned by each network device 140 processing the transaction. Network architecture map may then display the size of the response so that the user may better understand the data communicated between each network device 140. As another example, each transaction report may include a response time field indicating the time period for each of the plurality of network devices 140 to process the transaction. The network architecture map may then display the response times for each network device. In this manner, a user may quickly understand the processes, network devices, and data transfers involved for each type of transaction request offered by an enterprise.

Various embodiments may perform some, all, or none of the steps of method 900. For example, a network architecture map may any relevant data based on the type of map created. For example, network architecture map may illustrate each of the backend systems called by each network device 140 and the duration and method calls made to each backend system.

Certain embodiments of the invention may provide one or more technical advantages. Certain embodiments of the invention may provide one or more technical advantages. One advantage of the present disclosure allows for the seamless, non-invasive insertion of a unique identifier into network communications that is communicable between disparate network device types and protocols. Another technical advantage, allows for the identification network latencies between network devices without the need to install invasive tracking hardware on routing devices. Yet another advantage of the present disclosure allows for a reduction in the storage capacity needed to store transaction logs of network operations. One or more other technical advantages may be readily apparent to one skilled in the art from the figures, descriptions, and claims, included herein.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system for analyzing and reporting electronic transactions in a network environment, comprising:
a hardware interface configured to:
receive a transaction request at a first network device;
a hardware processor communicatively coupled to the interface, the processor operable to:
execute a task associated with the transaction request, wherein executing the task comprises calling one or more backend systems;
generate a uniform resource locator (URL) safe identifier, wherein the URL safe identifier identifies related transaction reports;
generate a transaction report associated with the transaction request and the task, wherein the transaction report comprises:
a request identifier comprising the URL safe identifier associated with the transaction request;
a request field comprising a task identifier and a URL resource name;
a time stamp field indicating a date and a time that the first network device received the transaction request;
a status code field indicating a status of the transaction request received by the first network device;
a duration field indicating a time period for the first network device to process the transaction request; and
a backend call summary field identifying the one or more backend systems called by the first network device to process the transaction request;
combine fields of the transaction report to format the transaction report as a single one-line string; and
insert the URL safe identifier into the transaction report as a header field; and
the interface is further operable to communicate the transaction report to a device comprising one or more hardware processors configured to implement a transaction module operable to aggregate the transaction report with one or more additional transaction reports associated with the transaction request using the unique identifier associated with the transaction request.

2. The system of claim 1, further comprising:
an entry point, the entry point operable to communicate the transaction request to the first network device, wherein the entry point is one selected from the group comprising a webserver and an automatic teller machine (ATM); and
the transaction report further comprises a source Internet Protocol (IP) field, the source IP field comprises an address of the entry point communicating the transaction request to the first network device.

3. The system of claim 2, wherein the transaction report further comprises a response size field, the response size field comprises a size of a response returned to the entry point.

4. The system of claim 1, wherein the transaction report further comprises a user identification field, the user identification field comprises a login name of a user associated with the transaction request.

5. The system of claim 1, wherein the transaction report further comprises a session identification field, the session identification field comprises a common identifier used for each of one or more additional transaction requests associated with a user.

6. A method for analyzing and reporting electronic transactions in a network environment, comprising:
receiving, at an interface, a transaction request at a first network device;
executing, using a hardware processor communicatively coupled to the interface, a task associated with the transaction request, wherein executing the task comprises calling one or more backend systems;
generating, using the hardware processor, a uniform resource locator (URL) safe identifier, wherein the URL safe identifier identifies related transaction reports;
generating, using the hardware processor, a transaction report associated with the transaction request and the executed task, wherein the transaction report comprises:
  a request identifier comprising the URL safe identifier associated with the transaction request;
  a request field comprising a task identifier and a URL resource name;
  a time stamp field indicating a date and a time that the first network device received the transaction request;
  a status code field indicating a status of the transaction request received by the first network device;
  a duration field indicating a time period for the first network device to process the transaction request; and
  a backend call summary field identifying the one or more backend systems called by the first network device to process the transaction request;
combining, using the hardware processor, fields of the transaction report to format the transaction report as a single one-line string;
inserting, using the hardware processor, the URL safe identifier into the transaction report as a header field; and
communicating, using the interface, the transaction report to a device comprising one or more hardware processors configured to implement a transaction module operable to aggregate the transaction report with one or more additional transaction reports associated with the transaction request.

7. The method of claim 6, further comprising:
communicating, using a network entry point, the transaction request to the first network device, wherein the entry point is one selected from the group comprising a webserver and an automatic teller machine (ATM); and
the transaction report further comprises a source Internet Protocol (IP) field, the source IP field comprises an address of the entry point communicating the transaction request to the first network device.

8. The method of claim 7, wherein the transaction report further comprises a response size field, the response size field comprises a size of a response returned to the entry point.

9. The method of claim 6, wherein the transaction report further comprises a user identification field, the user identification field comprises a login name of a user associated with the transaction request.

10. The method of claim 6, wherein the transaction report further comprises a session identification field, the session identification field comprises a common identifier used for each of one or more additional transaction requests associated with a user.

11. A non-transitory computer readable medium comprising logic, the logic operable, when executed by a hardware processor, to:
  receive a transaction request at a first network device;
  execute a task associated with the transaction request, wherein executing the task comprises calling one or more backend systems;
  generate a uniform resource locator (URL) safe identifier, wherein the URL safe identifier identifies related transaction reports;
  generate a transaction report associated with the transaction request and the executed task, wherein the transaction report comprises:
    a request identifier comprising the URL safe identifier associated with the transaction request;
    a request field comprising a task identifier and a URL resource name;
    a time stamp field indicating a date and a time that the first network device received the transaction request;
    a status code field indicating a status of the transaction request received by the first network device;
    a duration field indicating a time period for the first network device to process the transaction request; and
    a backend call summary field identifying the one or more backend systems called by the first network device to process the transaction request;
  insert the URL safe identifier into the transaction report as a header field; and
  combine fields of the transaction report to format the transaction report as a single one-line string; and
communicate the transaction report to a device comprising one or more hardware processors configured to implement a transaction module operable to aggregate the transaction report with one or more additional transaction reports associated with the transaction request.

12. The non-transitory medium of claim 11, wherein the logic is further operable to:
  communicate, using a network entry point, the transaction request to the first network device, wherein the entry point is one selected from the group comprising a webserver and an automatic teller machine (ATM); and
  the transaction report further comprises:
    a source Internet Protocol (IP) field, the source IP field comprises an address of the entry point communicating the transaction request to the first network device; and
    a response size field, the response size field comprises a size of a response returned to the entry point.

13. The non-transitory medium of claim 11, wherein the transaction report further comprises a user identification field, the user identification field comprises a login name of a user associated with the transaction request.

14. The non-transitory medium of claim 11, wherein the transaction report further comprises a session identification field, the session identification field comprises a common identifier used for each of one or more additional transaction requests associated with a user.

* * * * *